Patented Feb. 13, 1951

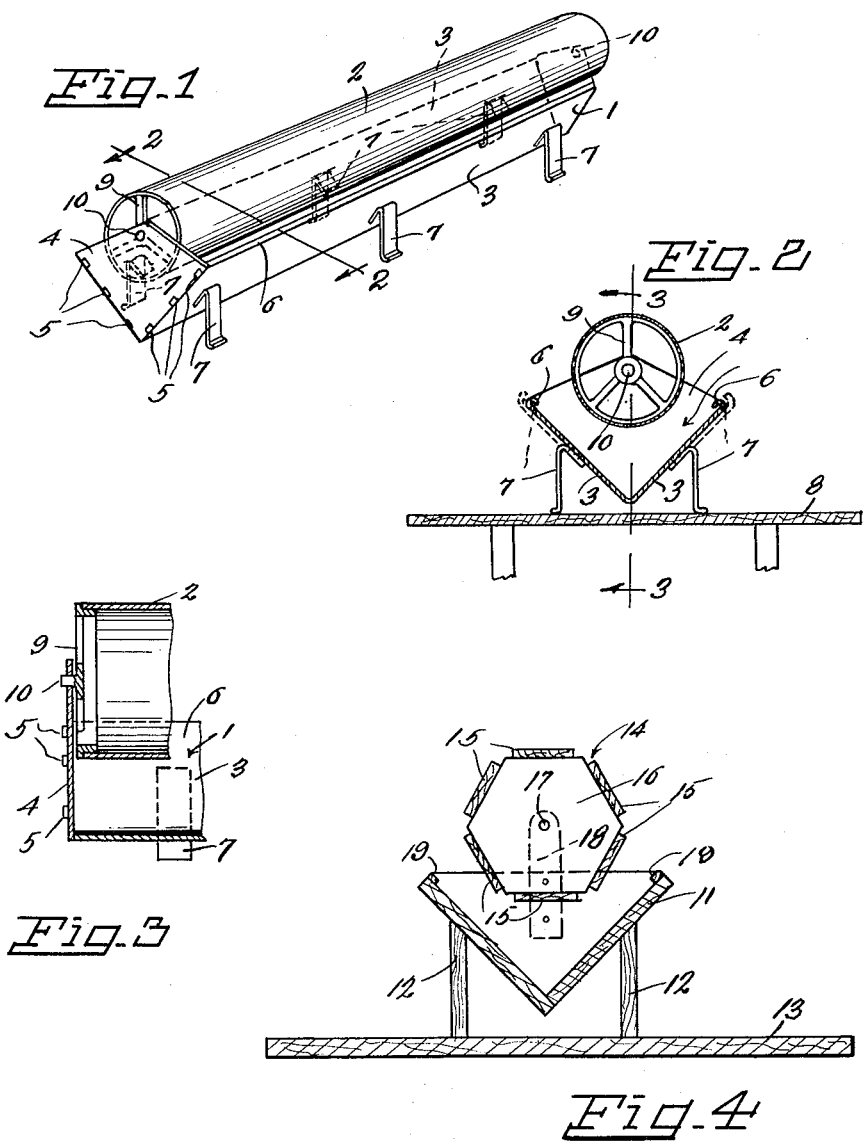

2,541,241

UNITED STATES PATENT OFFICE 2,541,241

CHICKEN FEEDER

Ray A. Grindstaff, Spokane, Wash.

Application September 4, 1945, Serial No. 614,250

1 Claim. (Cl. 119—61)

This invention relates to a poultry feeder and it is one object to provide a feeder of such construction that chickens and other poultry will be prevented from roosting on a feeding trough and stepping into the same and soiling feed in the trough or scratching feed out of the trough.

Another object of the invention is to provide a feed trough wherein a roller for preventing fowls from entering the trough is so located that it will very effectively prevent fowls from entering the trough, and also prevent the fowls from dragging feed from the trough while standing at one side of the trough with their heads thrust into the trough.

Another object of the invention is to provide a trough so supported that it will remain in an upright position and not be liable to tilt over.

Another object of the invention is to provide a feed trough which is of simple construction, cheap to manufacture, and efficient in operation.

The invention is illustrated in the accompanying drawings wherein:

Fig. 1 is a perspective view of the improved feeder.

Fig. 2 is a transverse sectional view taken along line 2—2 of Figure 1.

Fig. 3 is a sectional view taken vertically through one end portion of the feeder along line 3—3 of Figure 2.

Fig. 4 is a transverse sectional view of a feeder of modified construction.

This improved poultry feeder consists briefly of a trough 1 carrying a roller 2. The trough is formed of sheet metal and has upwardly diverging side walls 3 formed from a single sheet of metal and end walls 4 which fit close against the side walls and are secured by tongues 5. Upper edges of the side walls are folded inwardly to form lips 6 which provide the walls with smooth upper edges and prevent chickens from being cut when feeding from the trough. Lugs 7 formed from strips of sheet metal are provided at opposite sides of the trough and initially extend upwardly flat against the side walls, as indicated by dotted lines in Figure 2, so that the trough may be packed for shipment without danger of the legs becoming broken off and also allow a number of troughs to be nested when shipped. When the legs are bent downwardly they project below the trough and support the trough out of contact with the ground or a platform 8 provided in a chicken yard as a feeding platform for the chickens.

The roller 2 is also formed of sheet metal and consists of a cylinder of such length that it will fit into the trough between the end walls thereof. Spiders 9 are mounted in ends of the cylinder to reinforce the same and these spiders carry pintles 10 which project outwardly and engage through openings in the end walls 4 to rotatably support the roller. The diameter of the roller is such that space is left between the roller and the side walls, this space being such that while chickens may obtain food in the trough by turning their heads sideways it will be inconvenient for chickens to feed by merely thrusting their heads over side walls of the trough. This will prevent chickens from shaking their heads while feeding and causing feed to be scattered from the trough. The roller also serves to prevent chickens from stepping into the trough while feeding and if chickens attempt to roost by hopping upon the roller, the roller will turn and cause the chickens to lose their balance and be dislodged from the roller. It will thus be seen that chickens can not roost upon the roller and soil the feed in the trough.

In Figure 4 there has been shown a feeder of a modified construction. This feeder has a trough 11 which is similar in shape to the trough 1 but is formed of wood and provided with wooden legs 12 for supporting the trough in upwardly spaced relation to the feeding platform 13. The roller 14 is also formed of wood and consists of a plurality of slats 15 which extend longitudinally of the roller and have their ends nailed to heads 16. Pintles 17 project outwardly from centers of the heads and are rotatably engaged through openings in bearing brackets 18 carried by and projecting upwardly from end walls of the trough. There have also been provided strips 19 which extend along upper edges of the side walls and serve as scrapers against which chickens may scrape feed from their bills. In both embodiments of the invention the feeder consists of a trough over which a roller is rotatably mounted and serves to prevent chickens from scattering the feed or roosting upon the feeder and soiling feed in the trough.

Having thus described the invention, what is claimed is:

A poultry feeder comprising a trough having side walls and end walls, and a roller extending longitudinally in the trough and rotatably mounted between the end walls and projecting upwardly above the side walls and the ends walls, said side walls being flat and diverging upwardly transversely of the trough, and supporting legs for the trough formed from strips of stiff metal having inner end portions secured flat against outer faces of the side walls and outer end portions bent to form flat feet, the length of the legs between their feet and their attached inner end portions being greater than the distance from the said attached ends and the bottom of the trough whereby the legs when bent downwardly support the trough in upwardly spaced relation to the ground and the length of the legs between their feet and their attached inner end portions being also greater than the distance from their attached ends and upper edges of the side walls whereby the feet engage across upper edges of the side walls when the legs are disposed flat against outer faces of the side walls.

RAY A. GRINDSTAFF.

REFERENCES CITED

The following references are of record in the file of this patent:

UNITED STATES PATENTS

| Number | Name | Date |
|---|---|---|
| 1,172,913 | Slater | Feb. 22, 1916 |
| 1,720,684 | Moses | July 16, 1929 |
| 1,864,569 | Willauer | June 28, 1932 |
| 1,911,257 | Atchison | May 30, 1933 |
| 1,914,987 | Anderson | June 20, 1933 |
| 2,378,251 | Simmons | June 12, 1945 |